Sept. 5, 1950 F. H. OWENS 2,521,476

DISK RECORD AND FILM RECORD SOUND REPRODUCER

Filed May 15, 1946 4 Sheets-Sheet 1

INVENTOR
FREEMAN H. OWENS
BY James & Franklin
ATTORNEYS

Sept. 5, 1950 F. H. OWENS 2,521,476

DISK RECORD AND FILM RECORD SOUND REPRODUCER

Filed May 15, 1946 4 Sheets-Sheet 2

INVENTOR
FREEMAN H. OWENS

BY James & Franklin
ATTORNEYS

Sept. 5, 1950 F. H. OWENS 2,521,476

DISK RECORD AND FILM RECORD SOUND REPRODUCER

Filed May 15, 1946 4 Sheets-Sheet 3

INVENTOR
FREEMAN H. OWENS
BY
James & Franklin
ATTORNEYS

DISK RECORD AND FILM RECORD SOUND REPRODUCER

Filed May 15, 1946 4 Sheets-Sheet 4

INVENTOR
FREEMAN H. OWENS
BY James & Franklin
ATTORNEYS

Patented Sept. 5, 1950 2,521,476

UNITED STATES PATENT OFFICE 2,521,476

DISK RECORD AND FILM RECORD SOUND REPRODUCER

Freeman H. Owens, New York, N. Y.

Application May 15, 1946, Serial No. 669,779

24 Claims. (Cl. 179—100.3)

This invention relates to a sound reproducer and has special reference to the provision of a combined disc record and film record sound reproducer, especially designed for home use.

The sound reproducer herein disclosed represents a modification of the disc record and film record sound reproducer disclosed in my co-pending applications Serial No. 494,605, filed July 14, 1943, now Patent No. 2,466,124, granted April 5, 1949, and Serial No. 497,590, filed August 6, 1943.

The prime object of my present invention centers about the provision of a sound reproducing machine designed to be used for either the usual disc-type of phonograph record or with a film type of sound record, i. e., a film having a sound record photographically recorded thereon.

In carrying out this prime object, it is the main desideratum of the present invention to provide a combined reproducing machine in which the disc record turntable and its drive and the film record operating mechanism and its optical system are combined in a most simple manner and for optimum usefulness and service.

The home reproducer of the present invention comprises a machine embodying a turntable for disc records, a support for a film record magazine, a common driving means for both the disc record and the film record, and an optical reproducing system for the film record, all so related that either a disc record or a film record may be selectively used and played in the machine with optimum ease and convenience.

In the operation of this combined machine a number of desiderata are required to be fulfilled. When a disc record is to be played, it is desired to operate the machine after the manner of a simple phonograph. When a film record is to be played, it is desired to drive the film from the motor and driving means used for the disc record and at the same time to operate and control the optical reproducing system used with the film record. When a disc record is being played, this optical reproducing system is held inoperative. It is also desired that when a film record reaches the end of its playing period that the driving means be stopped and the optical reproducing system be cut off, and that these functions be accomplished without altering the operability of the machine for a subsequent selective disc record or film record use. These and other desiderata are accomplished by a control arrangement and automatic cut-off mechanism as herein disclosed.

Additional objects of the present invention, comprising specific improvements over my previous reproducers are:

1. To provide a simplified arrangement of mechanical parts with the particular purpose of eliminating the optical and film driving parts which are manually and mechanically movable into and out of the film record magazine when it is in position on the reproducer.

2. To provide a structure capable of accommodating a plurality of sizes of film record magazines, the adjustments of the reproducer mechanism necessary to adapt to the various sizes of film record magazines being automatically accomplished by the magazine itself.

3. To provide a structure in which, when the film sound record has completed its run, the sound record is automatically, positively, and promptly disengaged from its driving mechanism and the reproducer system therefor is deenergized.

4. To provide a structure the parts of which are so arranged that operability of the control means for the driving means and the optical system, the proper arrangement of the elements of the optical system, and the engagement of the film with its driving means are all interrelated so as to depend one upon the other and to be achieved substantially simultaneously.

To the accomplishment of the foregoing objects and such other objects as may hereinafter appear, my invention relates to the combined disc record and film record reproducing machine as hereinafter more particularly described in the specification and as sought to be defined in the claims. The specification is accompanied by drawings, in which:

*General description*

Figure 1:
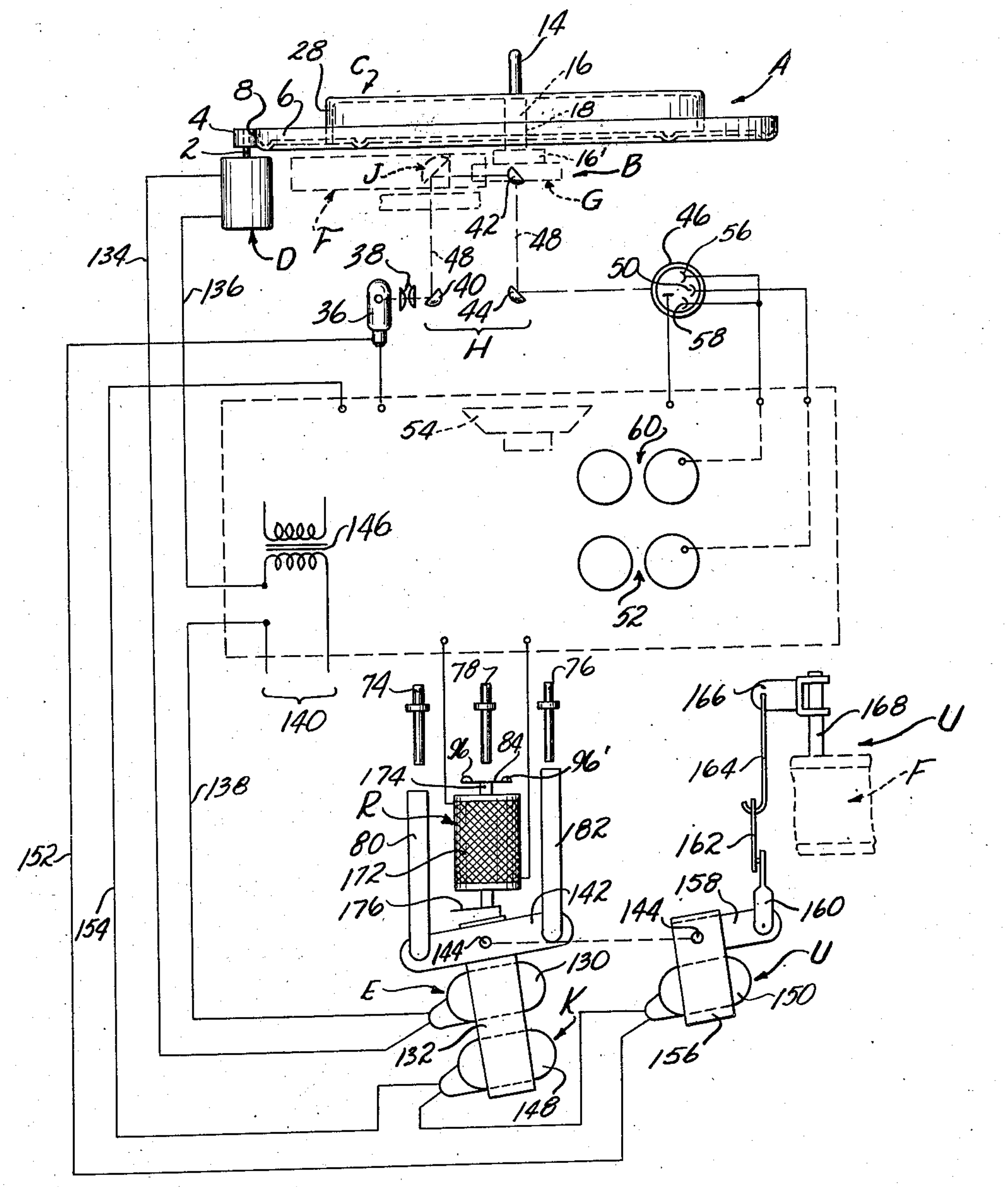
Fig. 1 is a schematic representation of various elements of my reproducer.

My reproducer is a combination in a compact and unitary structure particularly suitable for home use of a disc record sound reproducer, generally designated as A, and a film record sound reproducer, generally designated as B.

The disc record sound reproducer A may be of conventional construction comprising a turntable C frictionally connected to a motor D to be driven thereby and having manually and automatically operable control means E effective to start and stop the motor D. The reproducing mechanism may comprise a conventional tone arm containing a suitable needle-operated pickup and appropriate amplification means. Since this latter arrangement is well-known in the art and forms no part of the present invention, it is not here shown in order that the drawings be not unnecessarily complicated.

The film record sound reproducer B comprises a film record magazine F in which the film is carried. The internal construction of this magazine is similar to that disclosed in my copending application Serial No. 503,650, filed September 24, 1943, now Patent No. 2,455,187, granted November 30, 1948. A transparent film driving wheel G, also rotated by the motor D, is adapted to peripherally engage the film in the magazine F when that magazine is in its reproducing position, and acts both as a driving means for the film and a portion of the optical reproducing system H therefor. A second portion J of the optical system H is arrangeable in the magazine F, the magazine F being shaped so as to envelop and contain the same as the magazine is placed on the reproducer, the arrangement being such that light for reproducing purposes is transmittable through the film in the magazine between a point within the magazine defined by the optical portion J to a point outside the magazine, the light also passing through the transparent wheel G. A manually and automatically operable control means K for the optical reproducer system H is also provided.

The magazine F is movably received in the frame L of the reproducer, this being preferably accomplished by the provision of a film magazine support M which is slidable within the frame L between a first, or extended position for receving the film magazine F thereon to a second, or inserted position for reproducing the film sound record, and to which is affixed the optical portion J.

The support M, the optical portion J, the optical system H, the film driving wheel G and the manually operable parts of the control means E and K are so arranged that operability of the control means E and K, the arrangement of the parts of the optical reproducer system H for reproduction, and the engagement of the film with the driving wheel G are all achieved substantially simultaneously upon movement of the support M to its second or inserted position.

The film magazine F comprises take-up spool N and supply spool O on which film is wound. It is essential for proper operation of the reproducer that the take-up spool N be suitably driven so as to wind film upon itself as the film passes through the optical reproducer system H. To this end the frame L carries coupling means P adapted to connect the driving motor D to the take-up spool N to rotate the latter. The mechanical elements of the reproducer are so arranged that the coupling means P is effective on the take-up spool N only when the support M is in its second or inserted position on the frame L, the connection being made substantially simultaneously with the achievement of the relations described in the preceding paragraph.

The reproducer as here illustrated is constructed so as to be operable upon two sizes of magazines, a large size F which may contain a sound track capable of uninterrupted reproduction for twenty minutes, and a small magazine F′ capable of uninterrupted reproduction for five minutes, for example. The take-up spools N and N′ of the magazines F and F′ will, because of the different sizes of the magazines, occupy different positions on the frame L, and consequently, separate coupling means P and P′ must be provided to engage them. In addition, selector means Q, automatically controlled by the size of the magazine, either F or F′, which is placed in the reproducer, makes effective the appropriate one of the coupling means P and P′.

When the film has reached the end of its run, it is essential that the motion of the film in the magazine F be stopped or else the film would completely unwind from the supply spool O and rethreading of the film thereon would be necessary before it could be subsequently replayed. Consequently, control means R, actuated by the film in the magazine F, is effective on the control means E and K to automatically stop the operation of the film driving means and to deenergize the optical system H when the film sound track has been completely played.

The inertia of the rotating parts will cause them to continue to rotate even after the control means R has been actuated. It is a prime desideratum of equipment of this kind that it should operate smoothly and the greater the inertia of the moving parts, the smoother will be the operation. On the other hand, the greater the inertia of the rotating parts, the greater will be their tendency to continue to rotate after the control means R has operated. In order to prevent such continued rotation from completely unwinding the film from the supply spool O, the support M is spring-urged away from its second or inserted position and retaining means S acts to hold it in its second position during reproduction. Operation of the control means R by the film record will also release the retaining means S, whereby the support M is forced by the spring away from its second position, thus positively and promptly disengaging the film from the driving wheel G and simultaneously disengaging the take-up spool N from its coupling means P.

The turntable C and the film record magazine F are so arranged and connected that, as has been explained, the same motor D drives both. During disc record reproduction, the turntable C rotates in conventional fashion and the film driving means rotates but performs no useful function. During reproduction of the film sound record, the film driving means functions and the turntable C also rotates and serves to increase the inertia of the moving parts of the film driving means, thus acting as a fly wheel to smooth the operation thereof. It may be desired to add to the rotating parts a freely rotatable heavy momentum ring T to impart additional smoothing action.

When a disc record is being played, it is not desired that the optical system H be energized. Consequently, control means U is provided, sensitive to the presence or absence of a film record magazine F on the support M, so that when there is no magazine F in reproducing position, the optical system H will not be energized upon starting the driving motor D, but when a film magazine F is in reproducing position, the optical system H is preset for energization so that a single operation on the part of the user of my reproducer will energize both the motor D and the optical system H.

*Turntable and film driving systems*

Suitably mounted on the frame L of the reproducer is the motor D having a drive shaft 2 to which is attached a friction roller 4 which bears against and rotates a friction rim drive disc 6 having a rim 8 which is engaged by the roller 4 and has, in the embodiment here shown, a pair of concentric depending grooves 10 and 12 in the bottom thereof. The turntable C is mounted concentric with and above the disc 6 and has centrally disposed thereon a spindle, a part 14 of which projects upwardly in order to be receivable into the central aperture of conventional disc records and a part 16 of which extends downwardly through an aperture 18 in the disc 6 and is rotatably supported by ball bearings 20 secured between the clamps 22 and 24 held together by screws 26, 26', which clamps define the outer races of the bearings. The film driving wheel G comprises a transparent glass annulus which is secured to that portion of the turntable spindle 16' which extends below the ball bearings 20 for rotation therewith.

The turntable C is provided with a depending rim 28 having suitably disposed about the periphery thereof a plurality of teeth 30 adapted to engage with registering holes in the disc 6. By this construction it will be apparent that rotation of the motor D will rotate the disc 6, the turntable C, and the film driving wheel G.

Figures 3, 4, 5:
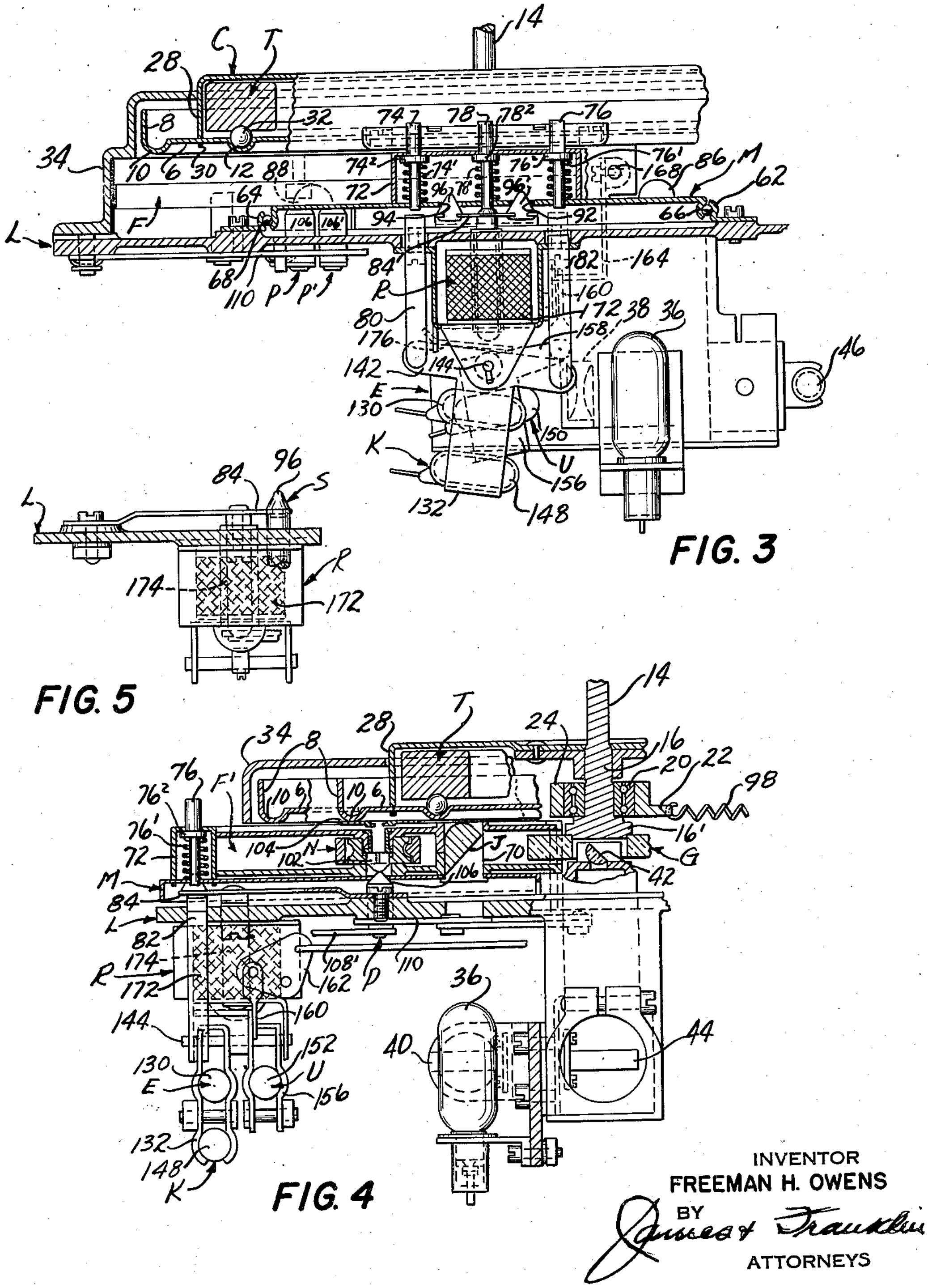
Fig. 3 is a side cross-sectional view of a portion of the reproducer carrying a large size magazine, taken along the line 3—3 of Fig. 2, with the turntable and turntable guard partially exposed in cross-section.
Fig. 4 is an end view, on a reduced scale, of a portion thereof carrying a large size magazine, taken along the line 4—4 of Fig. 2.
Fig. 5 is an end view of the solenoid and the support-retaining means.

As previously explained, it may be desired to increase the inertia of the moving parts of the reproducer to improve the smoothness of operation by additionally providing a rotatable heavy momentum ring T, shown in Figs. 3 and 4. This ring is in the form of an annulus made of heavy material which is retained between the top of the turntable C, the depending rim 28 thereof and the disc 6 and is freely rotatably supported upon ball bearings 32 which are retained in the depending groove 12 of the disc 6. During operation of the reproducer, the ring T will rotate because of the friction between itself and the disc 6 and will thus add its considerable inertia to that of the remainder of the apparatus. Should it be desired to stop the rotation of the apparatus, however, that function can be accomplished without the necessity of completely stopping the rotation of the ring T, because the ring T is freely rotatable on the disc 6. The ring T performs an additional function in the operation of the apparatus by weighting the outer periphery of the disc 6 and thus forcing it downward so that the concentric grooves 10 and 12 may efficiently act as part of the coupling means P and P', as will be described more in detail hereinafter.

In order to improve the appearance of the reproducer, a turntable guard 34 is attached to the frame L in order to cover all of the moving parts of the driving system except the top of the turntable C and the spindle part 14 projecting thereabove.

*Optical system*

The optical system H of my reproducer, which may best be understood from a study of the schematic diagram of Fig. 1, includes features described with more particularity in my aforementioned copending applications Serial No. 494,605, filed July 14, 1943, and Serial No. 497,590, filed August 6, 1943. It comprises a lamp 36, a condensing lens system 38, a reflector 40, a second reflector J receivable within the magazine F, the transparent annular film driving wheel G, a third reflector 42 located within but not revolving with the wheel G, a fourth reflector 44 and a photo-electric cell 46, all of which, except for the elements J and G, are suitably mounted in brackets on the frame L. The path of light is shown by the broken line 48 of Fig. 1 and light is thus seen to pass from the lamp 36 to the reflector J located within the film magazine F and thence through the film and the transparent driving wheel G to the reflector 42 and thence to the photo-electric cell 46, the light-sensitive element 50 of which is connected to a suitable amplifier, generally designated as 52, the variations in intensity of the light there being transformed into electrical variations which actuate a loud speaker 54.

In order to actuate the control means R there may be provided at the end of each sound track an appropriate control track which, when exposed to light from the lamp 36, energizes the light-sensitive elements 56 and 58 of the photo-electric cell 46 which in turn are connected to a suitable amplifying system, generally designated as 60, the output of which actuates the control means R. Details of such an arrangement are disclosed with more particularity in my copending application Serial No. 644,341, filed January 30, 1946, now Patent No. 2,510,599, granted June 6, 1950.

*Film magazine supporting arrangement*

Figure 2:
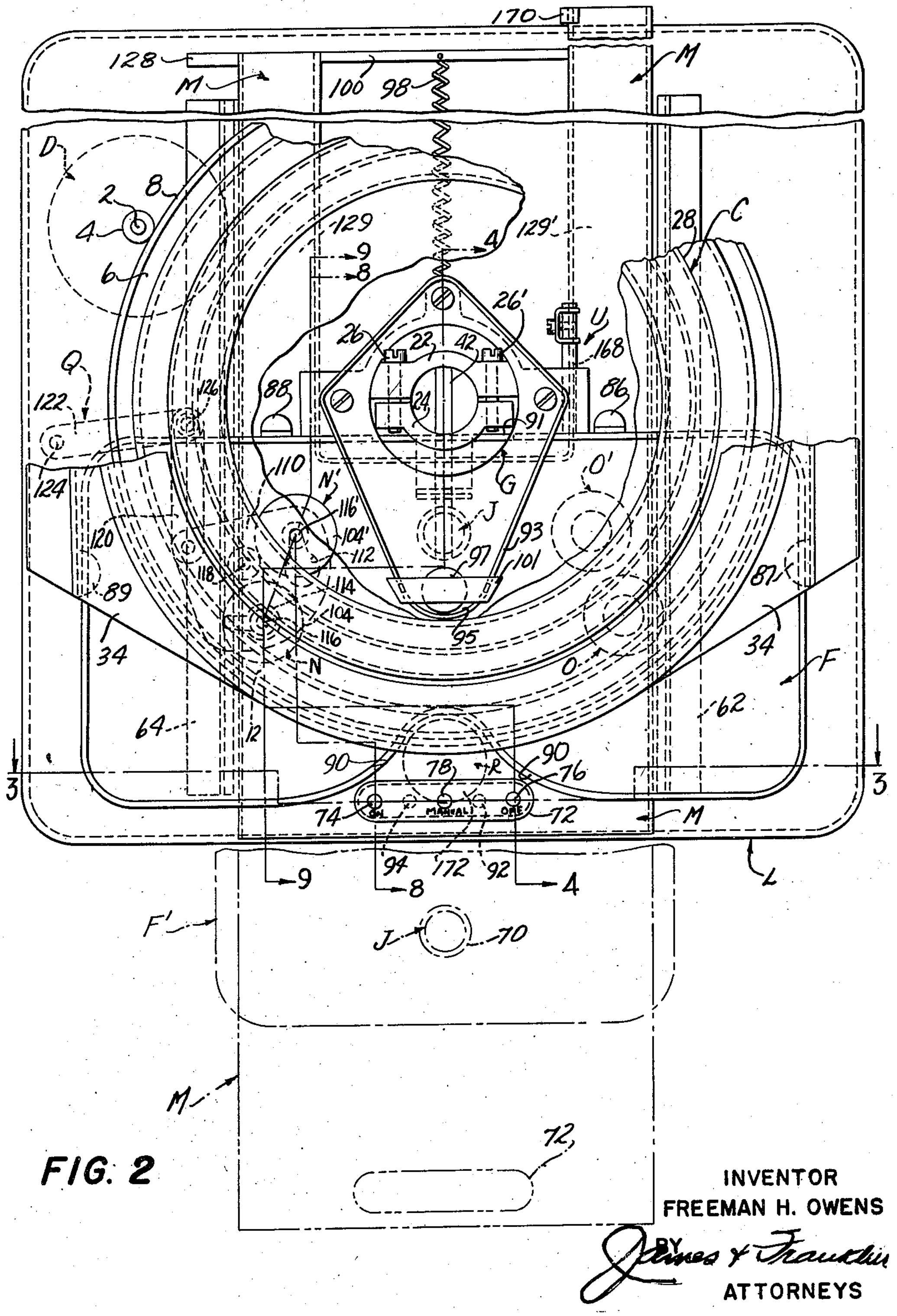
Fig. 2 is a top view of the reproducer and a large size magazine thereon with parts cut away, and showing with broken lines the sliding support in its extended position with a small size magazine thereon.
Figures 6, 7:
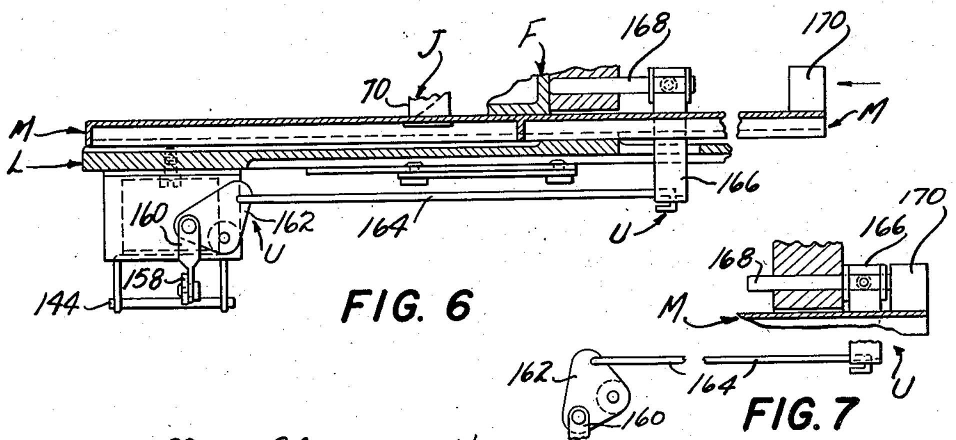
Fig. 6 is a side cross-sectional view of a portion of the mechanism illustrating the mechanical linkages of the control means effecting the energization of the reproducer system and controlled by the presence of a film record magazine in the reproducer.
Fig. 7 is a fragmentary view of the mechanism of Fig. 6 but showing the other operative position thereof.
Figure 8:
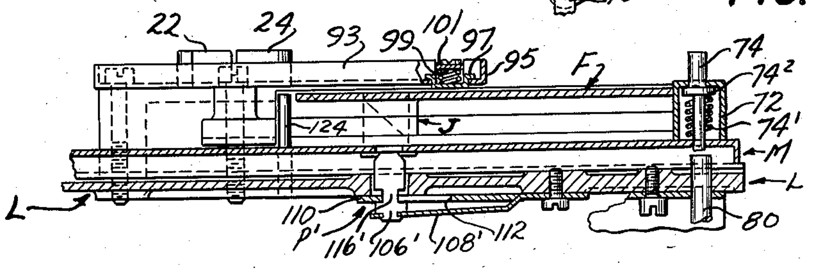
Fig. 8 is an end cross-sectional view, taken along the line 8—8 of Fig. 2.
Figure 9:
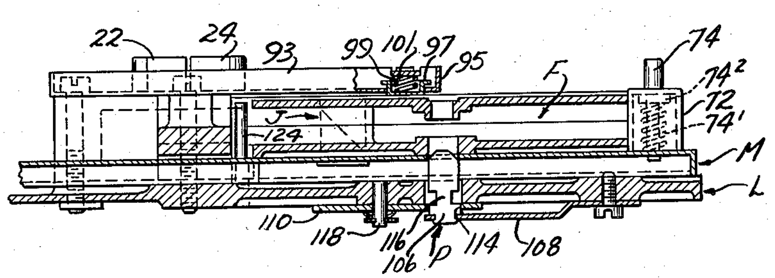
Fig. 9 is an end cross-sectional view, taken along the line 9—9 of Fig. 2.
Figure 10:
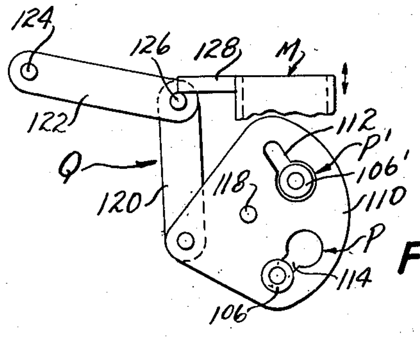
Fig. 10 is a fragmentary view of a portion of the selector means controlled by the size of the magazine in the reproducer to make effective the appropriate coupling means.

Guide means 62 and 64 are mounted on the frame L and the support M is mounted between them so as to be slidable on balls 66 and 68 between a first or extended position, shown by the broken lines in Fig. 2 and by Figs. 7 and 10, to a second or reproducing position illustrated by the solid lines of Fig. 2 and by Figs. 3, 4, 6, 8 and 9. Appropriately mounted on the support M so as to project thereabove is the tube 70 containing the optical portion J.

Centrally located near the outer edge of the support M is a push button housing 72 carrying three push buttons, an on button 74, an off button 76, and a manual button 78, each spring-urged upwardly by springs 74', 76' and 78' respectively compressed between the upper surface of the support M and a flange $74^2$, $76^2$ and $78^2$, said flanges also preventing the push buttons 74, 76 and 78 from being forced out of the housing 72 under pressure from the springs. The lower tips of the respective push buttons project below the support M through apertures therein and, when the support M is in its second or reproducing position, come into registration with push rods 80 and 82, and spring plate 84 respectively.

When the support M is in its second or reproducing position, it is substantially covered by various parts of the reproducer including the turntable C, the disc 6, the magazine retainer 93 and the turntable guard 34 so that it is impossible in that position to place a film magazine F upon the support M. When the support M is in its first or extended position, however, the tube 70, in which is housed the optical portion J, takes up the position indicated by the dotted circle in Fig. 2, and in such a position, the film record magazine F may be placed on the support M. The magazine is suitably apertured so as to snugly receive therein the tube 70 (see particularly Fig. 4), said tube thus acting in part as a key to ensure the proper positioning of the magazine F in the reproducer. Lips 86 and 88, against which the front face of the magazine F abuts, assist in proper positioning of the film magazine F. Lips 87 and 89 provide lateral support for the large size magazine F.

The front face of the film magazine F is apertured and indented, as at 91, so as to permit the driving wheel G to enter thereinto and to peripherally engage the film in order to drive the same and to assist in reproducing the sound film recorded thereon. The rear face of the magazine F is also indented, as at 90, so as to clear the push button housing 72.

Mounted on the frame L beneath the disc 6 is the magazine retainer 93 which carries at its tip 95 a button 97 projecting downwardly through a suitable aperture in the lower surface of the retainer 93 and resiliently urged in that direction by spring 99 mounted in compression between the button 97 and strap 101. The button 97 thus bears against the top surface of the film magazine F as the latter is inserted into the reproducer, the pressure imparted thereby serving to steady the magazine F when it is in its reproducing position.

The support M is orificed within the push button housing 72 at 92 and 94 and lock pins 96, 96′, which constitute the retaining means S, are mounted at an extremity of spring plate 84, the other end of which is suitably attached to the frame L (see Fig. 5) so that when the support M is in its second or reproducing position, the lock pins 96, urged upward by the spring plate 84, will enter into the orifices 92 and 94 and thus retain the support M in its second position. A spring 98 mounted on framework 100 is active, when the support M is in its second position, to urge that support away therefrom and toward its first or extended position, this action being restrained by the lock pins 96.

The various parts of the film magazine F, the optical system H, the push button housing 72, the push rods 80 and 82, and the lock pins 96 are so positioned that when, and only when, the support M is in its second or reproducing position, the film driving wheel G will peripherally contact the film record magazine F, the optical portion J carried by the support M and arranged within the magazine F will come into its proper position above the reflector 40, the push buttons 74 and 76 will come into registration with the push rods 80 and 82, and the lock pins 96, 96′ will enter the orifices 92 and 94 in the support M.

Thus, manual operation of the control means E and K to energize the film and turntable driving motor D and the optical system H can only take place when the optical sytem H has its parts properly arranged one with respect to the other and when the film in the magazine F properly engages its driving means. If reproduction of a disc record is desired, no film magazine F will be placed on the support M but the support M must nevertheless be positioned in its second position before manual control of the reproducer can be attained.

By the same token, when the support M is in its first or extended position, so that a film magazine F may be placed upon it, the film driving means cannot be started and thus it is impossible to suddenly force the film in the magazine F against an already rotating film driving wheel G, an operation to be avoided because of the excessive strains placed thereby on the film.

*Coupling means and selector means*

Each film magazine F has a take-up spool N adapted to wind film upon itself during the reproduction operation and a supply spool O from which film is unwound. It is essential, if the film is to be in condition for reuse after reproduction, that it pass smoothly from the supply spool O to the take-up spool N during the reproducing operation and hence it is necessary that the take-up spool N be driven. This is accomplished in my reproducer in a highly novel and efficient fashion. Fig. 4 discloses a take-up spool N of conventional construction which has keyed thereto and axially slidable therein a take-up shaft 102, to the upper end of which is attached a friction disc 104. When the support M is in its second or reproducing position, the friction disc 104 is positioned with respect to one of the concentric grooves 10 or 12 in such a manner that if the disc 6 rotates, passage of the lower surface of the groove 10 or 12 over the friction disc 104 will rotate the latter and thus, by means of the take-up shaft 102, will rotate the take-up spool N.

In order to ensure adequate frictional contact between the groove 10 or 12 and the friction disc 104, a tension pin 106 is vertically slidably mounted in the frame L and is attached to an extremity of spring plate 108, the other end of which is attached to the frame L, the pin 106 being thereby resiliently urged upward. The film magazine F and the support M are provided with registering apertures which, when the support M is in its second or reproducing position, come into registration with the tension pin 106. The tension pin is urged thereinto by the spring plate 108, and the upper end of the tension pin 106 contacts the lower end of the axially slidable take-up shaft 102 forcing the latter upward and thus forcing the frictional disc 104 into frictional contact with the groove 10 or 12. The ring T assists, as has hereinbefore been explained, in the attainment of adequate frictional contact.

It is to be noted that the driving connection between the motor D and the take-up spool N is made only when the support M is in its second or reproducing position and consequently is made simultaneously with the contact of the film with the driving wheel G, the proper positioning of the optical portion J in the optical system H, the registration of the push buttons 74 and 76 with the push rods 80 and 82, and the engagement of the lock pins 96 into apertures 92 and 94 in the support M.

It is contemplated that the film will carry two sound tracks each disposed longitudinally along the film side by side. In order to avoid the necessity for rewinding the film onto the supply spool O prior to reproduction of the second sound track, it is desirable that they run in opposite directions so that all that will be necessary to play the second sound track after the first has been reproduced is to turn the film magazine upside down on the support M. What was the take-up spool N for the first operation will then become the supply spool O for the second operation and the converse is, of course, true for the supply spool O in the first operation.

With my reproducer, after completion of reproduction of the first sound track, the support M will be withdrawn to its second position and the film magazine F will be removed therefrom, inverted, and replaced on the support M, the ex-supply spool O taking up the position of the take-up spool N. The walls of the magazine will be suitably apertured to accommodate the coupling means P, this being accomplished by providing a tension pin receiving orifice in the bottom wall of the film magazine F of Fig. 2 in the position of spool N and providing a similar orifice in the top wall thereof over the supply spool O, this latter orifice coming into registration with the tension pin 106 when the film magazine is inverted for the reproduction of the second film record.

Conventional disc records are produced in different sizes and it is a prime object of my invention to provide a film record reproducer which is adapted to receive film record magazines of different sizes, here illustrated by magazines F and F', the latter being the smaller size magazine and shown in broken lines in Fig. 2. Because of the difference in sizes, the take-up spools N and N' of the magazines F and F' will take up different positions in the apparatus when their respective magazines are in reproducing position (see Fig. 2) and consequently separate coupling means P and P' must be provided, one for each size of magazine.

Accordingly, two concentric grooves 10 and 12 are provided in the disc 6, the former active upon the friction disc 104 of the large size magazine and the latter active upon the friction disc 104' of the small size magazine, as may be seen from Fig. 2. Similarly, a pair of tension pins 106, 106' must be provided, each spring-urged upward by a separate spring plate 108, 108'.

In order that the unused tension pin 106 or 106' not bear against and thus possibly interfere with motion of the support M, a selector means Q is provided, automatically controlled by the size of magazine placed on the support M, to make effective the appropriate one of the coupling means P or P'. This selector means Q may comprise a lock plate 110 provided with a pair of keyhole shaped apertures 112 and 114. The large portion of each of these apertures is of sufficient size to permit free motion of a tension pin 106 therethrough (see Fig. 9). The small portion thereof will receive only the narrowed body portion 116, 116' of each tension pin (see Fig. 8). The lock plate 110 is pivotable about stud 118, pivotal motion being imparted thereto by means of link 120 which in turn is pivotally connected to lever 122 itself pivotally mounted on the frame L by means of stud 124.

When the plate 110 is in the position shown in Figs. 2, 8 and 9, tension pin 106 is released for action upon the take-up shaft 102 of the magazine F and tension pin 106' is retained in a depressed position by the smaller portion of the orifice 112 encompassing its narrow body portion 116'. When the plate 110 is in the position shown in Fig. 10, the opposite situation obtains, the tension pin 106 being held down.

Obviously, the former position of the plate 110 is appropriate for the employment of the large magazine F and the latter position of the plate 110 is appropriate for the employment of the smaller magazine F'. In order that the plate 110 may be properly positioned for the size of the magazine to be used, the member connecting the link 120 with the lever 122 comprises an upwardly projecting pin 126 so positioned that if the support M is moved into its second or reproducing position, the front face of a large magazine F thereon will contact the pin 126 and will move it to the position shown in Fig. 2 and thus will automatically make effective the appropriate coupling means P. If the support M is moved to its first or extended position, a lug 128 on one of the inwardly extending lugs 129, 129' thereof will contact the pin 126 and move the plate 110 to its position shown in Fig. 10, freeing tension pin 106' and thus making effective coupling means P'. Should a small magazine F' now be placed on the support M and be moved to reproducing position, the small magazine F' will not contact the pin 126 and consequently the coupling means P', appropriate to the small magazine F', will remain effective. Should a large magazine F be placed on the support M, it will, as previously explained, contact the pin 126 and thus pivot the plate 110 so as to make effective the coupling means P appropriate to the large magazine F.

It will be apparent from Fig. 9 that once a tension pin 106 or 106' passes upwardly through the large part of the opening 112 or 114, the narrowed body portion 116, 116' thereof is no longer in position to be engaged by the smaller part of the apertures 112 or 114. However, the tips of the pins 106, 106' which project through the apertures in the support M and the magazine F are tapered, and when the support M and the magazine F are moved from their second or reproducing position, the pin 106 or 106' is, by cooperation of the tapered tip surfaces with the orifice walls, cammed down to a position where the smaller portions of the orifices 112 and 114 can engage the narrowed body portions 116, 116'.

*Control means*

The control means E for the motor D comprises a mercury switch 130 clamped in cradle 132 and connected in series in the electrical circuit defined by wires 134, 136, 138 and power supply source 140. The cradle 132 is attached to rocker arm 142 which in turn is pivotable about pin 144, pivotal motion being imparted by push rods 80 and 82 pivotally attached thereto, that pressure in turn being imparted by suitable manual actuation of push button 74 or 76. Pressure on push button 74, when the support M is in its second or reproducing position, will force down push rod 80, thus rotating cradle 132 in a counterclockwise direction as viewed in Figs. 1 and 3, and closing the circuit to the motor D, causing it to rotate. It will also close the circuit to the transformer 146 which serves as the power supply source for the electrical amplifiers 52 and 60. Rotation of the motor D will, as has previously been explained, rotate the turntable C, the film driving wheel G, and the disc 6 the concentric grooves 10 and 12 of which act as driving means for the take-up spool N of the film magazine F.

Also mounted in the cradle 132 is a second mercury switch 148 which comprises the control means K for the optical system H. It is tilted to a position to energize the lamp 36 at the same time that the switch 130 energizes the motor D. However, if a disc record is to be reproduced, it is not good practice to keep the lamp 36 burning, such lamps having but a limited life. Consequently, a second mercury switch 150 is connected in series with the mercury switch 148, the simultaneous closing of both switches energizing the lamp 36 via wires 152 and 154. The switch 150 is mounted in a cradle 156 also oscillatable about pin 144 independently of cradle 132. Rocker arm 158 is pivotally connected to link 160 which in turn is connected to pivoted lever 162. Rod 164 connects pivoted lever 162 to arm 166 attached to pin 168 which is slidably mounted in the frame L in such a position as to be contacted and pushed rearwardly by the front face of a magazine F or F', no matter of what size, when that magazine is carried by the support M to its reproducing position (see Fig. 6). When the pin 168 is in its rearward position, as shown in Figs. 2 and 6, the linkage above described tilts the cradle 156 so that the mercury switch 150 is in its closed position. Subsequent pressure of the on push button 74 will then tilt the cradle 132 so as to close the switches 130 and 148, thus simultaneously energizing the motor D and the lamp 36 of the optical system H.

When the support M is pulled to its first or extended position in order to remove therefrom the film magazine F, a lug 170, on the arm 129 of the support M, contacts the inner end of the pin 168 and slides it forward to the position shown in Fig. 7, thus tilting the cradle 156 so that the mercury switch 150 is in its open position. Should it then be desired to reproduce a disc record, the support M will be pushed to its second or reproducing position, but since no film magazine F will be placed thereon, the pin 168 will remain in the position shown in Fig. 7, and subsequent pressure on the on push button 74 will merely energize the motor D, the electrical circuit to the lamp 36 remaining open despite the closing of switch 148 by reason of the fact that the switch 150 in series therewith is open. If, however, a film magazine F or F' be placed on the support M for reproduction of the film sound record therein, motion of the support M to its first or reproducing position will automatically bring the front face of the magazine F or F' against the pin 168, will slide that pin to its rear position shown in Fig. 6, and will therefore tilt the cradle 156 and position the switch 150 in its closed position, thus presetting the circuit to the optical system H so that subsequent closing of the switch 148 will energize it.

It is imperative when reproducing a film sound record that when the film has reached the end of its run, the unwinding thereof from the supply spool O must be stopped before the film has completely unwound therefrom or else rethreading will be necessary before the magazine F is in condition for subsequent reproduction. As has been stated, mere deenergization of the driving motor D is insufficient to ensure accomplishment of this objective since the inertia of the moving parts will cause them to continue to rotate even after the driving force of the motor D has been removed.

Consequently, control means R is provided which is actuated by the end of the film sound track to automatically deenergize the motor D and the optical system H and at the same time ensure the prompt and positive disengagement of the film and the magazine F from the driving means therefor. To this end a solenoid 172 is provided in which is mounted a movable iron core 174, the upper end of which is attached to the leaf spring 84 which carries the lock pins 96, 96'. The lower end of the core 174 is active upon a spring leverage plate 176 attached to the top of the rocker arm 142. Energization of the solenoid 172 causes the core 174 to move downward pulling down with it leaf spring 84 and lock pins 96 and thus releasing the support M from the restraining action of the pins 96 and permitting the spring 98 to pull the support M away from its inner position. The pull thus exerted may be effective over only a short distance, on the order of a fraction of an inch, but that will be sufficient to remove the film from its peripheral engagement with the driving wheel G and also to remove the take-up spool N from its position in engagement with the tension pin 106 and the concentric groove 12. Thus, even if the driving wheel G and the disc 6 continue to rotate, that rotation will not be transmitted to the film in the magazine F and thus unwinding of the film from the supply spool O is prevented.

As the core 174 is forced down in response to the energization of the solenoid 172, its action upon the spring leverage plate 176 acts to tilt the rocker arm 142 and consequently the cradle 132 to the off position in which both switches 130 and 148 are opened, thus opening the circuits to and deenergizing the motor D and the optical system H.

Manual push button 78 will, when the support M is in its second or reproducing position, be in registration with the top of the core 174 and manual pressure thereon will serve not only to force down the lock pins 96 and release the support M but will also turn off the motor D and the optical system H. For reproduction of disc records, use of the manual push button 78 will not be necessary, the motor D being turned on and off by means of the push buttons 74 and 76 and the optical system H being deenergized because of the absence of a film magazine F on the support M. Should it be desired, however, to discontinue the reproduction of a film sound record before that record has completed its run, the manual push button 78 would be pressed, thus deenergizing both the motor D and the optical system H and also releasing the support M so that the film magazine F may be removed or replayed.

*Operation*

When reproduction of a disc record is desired, the support M must first be placed in its reproducing position in which it is retained against the action of the spring 98 by retaining means S. Control of the rotation of the turntable C and energization of the amplifier connected to the reproducing head (not shown) is accomplished by depression of the on push button 74 which by means of the linkage above described, tilts the mercury switch 130, which comprises the control means E for the motor D, to its on position, thus energizing the motor D and causing rotation of the turntable C. Since no film magazine F will be on the support M during reproduction of a disc record, the pin 168 will be in its forward position as shown in Fig. 7 and consequently the switch 150, which comprises the control means U, will be in its open position and hence the optical system H will not be energized.

To stop the rotation of the turntable C, the off push button 76 will be depressed, thus tilting the switch 130 to its open position and deenergizing the motor D without releasing the support M from its reproducing position.

If reproduction of a film sound record is desired, the support M is first released from its reproducing position by depression of the manual push button 78 which is turn depresses leaf spring 84 and thus withdraws the lock pins 96 from the cooperating orifices 92 and 94 in the support M. The spring 98 moves the support M part way out from its reproducing position and the support is then grasped and moved all the way out, the lug 170 on the arm 129 thereof coming up against the inner end of the pin 168 and the lug 128 on the arm 129′ thereof contacts with the pin 126 of the selector means Q, both pins thus being moved to the positions shown in Figs. 7 and 10. The pins 126 and 168, in addition to performing the above-described functions, also act as stops which properly position the support M in its extended position and prevent the support from being withdrawn so far as to become disengaged from the remainder of the mechanism.

A film magazine F or F′ is then placed upon the support M in such manner as to have its front face abut the lips 86 and 88 and so as to encompass the tube 70 containing the optical reflector J in the orifice provided in the magazine body for that purpose. The support M is then pushed in to its reproducing position, the following effects being thus substantially simultaneously achieved:

1. The film in the magazine is brought into peripheral engagement with the driving wheel G.

2. The pin 168 is pushed backward to its position shown in Fig. 6, thereby rotating the switch 150 to its closed position.

3. The optical reflector J is properly positioned with respect to the other elements of the optical system H so that system may function.

4. The spring 98 is extended and the retaining means S serves to hold the support M in its reproducing position against the tension of spring 98.

5. The selector means Q makes effective the coupling means P or P′ appropriate to the size of magazine F or F′ which has been placed on the support M in the following manner:

If a large magazine F is employed, its front face will contact the pin 126 and move it to the position shown in Fig. 2, thereby rotating lock plate 110 to release tension pin 106, which in turn enters the magazine F and, by action upon the take-up spool N thereof, forces the friction disc 104 into contact with the groove 10 of disc 6.

If a small magazine F′ has been placed on the support M, the pin 126 will remain in its forward position of Fig. 10 and consequently the lock plate 110 will be in a position to release the tension pin 106′, thereby causing the friction disc 104′ to come into contact with the groove 12 in the disc 6.

Subsequent depression of the on push button 74 energizes the driving motor D by means of the control means E and also energizes the optical system H by means of the control means K. Rotation of the motor D rotates the film driving wheel G and the coupling means P so that the film is caused to move through the optical system H and the variations in intensity of the light passing therethrough and received by the photo-electric cell 46 are amplified and transform into sound.

When the film record has reached the end of its run, any appropriate means, such as the employment of a control track thereon in conjunction with the specially designed photo-electric cell 46, energizes the control means R, here the solenoid 172. The following operations then take place substantially simultaneously:

1. The leaf spring 84 is drawn downward, thus removing the lock pins 96 from the cooperating orifices 92 and 94 in the support M releasing the latter.

2. The spring 98 pulls the support M part way out from its reproducing position, thereby 3. Removing the film from peripheral engagement with the driving wheel G, and 4. Removing the take-up spool N of the film magazine F from driven engagement with the coupling means P.

5. The control means E and K are both moved to their open positions, thus deenergizing the driving motor D and the optical system H.

Should it now be desired to reproduce the second sound track carried by the film in the magazine F, the support M will be pulled all the way out and the magazine F will be removed therefrom, inverted, and replaced thereon. The sequence of steps and results above recited is then repeated.

It will be apparent that many variations may be made in the design of my combined disc record and film record sound reproducer without departing from the spirit of the invention as defined in the following claims.

I claim:

1. A film record sound reproducer comprising a frame, a support for a magazine containing a film sound record movable within said frame between a first position for receiving the magazine thereon and a second position for reproducing said film sound record, and an optical reproducer system on said frame including an optical portion carried by said support, said support positioning said optical portion in said optical reproducer system only when said support is in its second position.

2. A film record sound reproducer comprising a frame, a support for a magazine containing a film sound record movable on said frame between a first position for receiving the magazine thereon and a second position for reproducing said film sound record, a driving means for said sound reproducer on said frame, an optical reproducer system on said frame including an optical portion carried by said movable support, and control means on said frame for said driving means and said optical reproducer system, said support and said control means being operatively connected so that when said support is in its first position it disables said control means and when said support is moved to its second position it positions said optical portion in said optical reproducer system and renders said control means operable.

3. A film record sound reproducer comprising a frame, a support for a magazine containing a film sound record movable within said frame between a first position for receiving the magazine thereon and a second position for reproducing said film sound record, an optical reproducer system on said frame including an optical portion carried by said support and movable with said support into and out of said system, and a film record magazine having a recess and positionable on said support so as to receive said optical portion within said recess said support positioning said optical portion carried thereby in said reproducer system and operatively positioning said magazine positioned thereon with respect to said reproducer system only when said support is in its second position.

4. In combination, a film record sound reproducer comprising a frame, a support for a film sound record magazine movable within said frame, a film driving wheel, a film sound record magazine on said support and comprising a supply spool, a take-up spool, and film wound on said spools, a rotatable member positioned above said magazine, said driving wheel being connected to said rotatable member for rotation therewith, a coupling means adapted to connect said rotatable member and said take-up spool, and a driving means for said rotatable member, said support being movable between a first position for receiving said magazine and a second position in which the film peripherally engages said driving wheel and in which said coupling means engages the take-up spool to drive the same.

5. In combination, a film record sound reproducer comprising a frame, a support for a film sound record magazine movable within said frame, an optical reproducer system on said frame including an optical portion carried by said support, a film driving wheel, a film sound record magazine comprising a supply spool, a take-up spool, and film wound on said spools, said magazine being positioned on said support so as to receive said optical portion within itself, a rotatable member on said frame positioned above said magazine, said driving wheel being connected to said rotatable member for rotation therewith, a coupling means adapted to connect said rotatable member and said take-up spool, and a driving means for said rotatable member, said support being movable between a first position for receiving said magazine and a second position in which the film peripherally engages said driving wheel, in which said optical portion is positioned in said optical reproducer system, and in which said coupling means engages said take-up spool to drive the same.

6. A film record sound reproducer comprising a frame adapted to receive film sound record magazines of different sizes, said film magazines each comprising a supply spool and a take-up spool on which film is wound, driving means for said take-up spool, coupling means adapted to connect said driving means to said take-up spool, and means actuated by the magazine placed on said frame to automatically adapt said coupling means to said magazine size.

7. A film record sound reproducer comprising a frame, a support adapted to receive film magazines of various sizes, said film magazines comprising a supply spool and take-up spool on which film is wound, driving means for said take-up spool, separate coupling means for each size of magazine each adapted to connect said driving means to said take-up spool, and means actuated by the magazine placed on said support to make effective the appropriate one of said coupling means according to the size of said magazine, said support being movable with respect to said frame between a first position for receiving said magazine and a second position in which the appropriate one of said coupling means engages said take-up spool to drive the same.

8. A film record sound reproducer comprising a frame, a support adapted to receive film magazines of various sizes, said film magazines comprising a supply spool and a take-up spool on which film is wound, driving means for said take-up spool, separate coupling means for each size of magazine each adapted to connect said driving means to said take-up spool, said support being movable with respect to said frame between a first position for receiving said magazine and a second position in which the appropriate one of said coupling means engages said take-up spool to drive the same, and means to make effective the appropriate one of said coupling means, said means being controlled by the magazine on said support as said support is moved from its first to its second position and being reset for subsequent control by said support as said support is moved from its second to its first position.

9. In the film record sound reproducer of claim 4, a support on said frame adapted to receive film magazines of various sizes, separate coupling means on said frame for each size of magazine, and means actuated by the magazine placed on said support to make effective the appropriate one of said coupling means according to the size of said magazine.

10. In the film record sound reproducer of claim 4, a support adapted to receive film magazines of various sizes, separate coupling means for each size of magazine, and means to make effective the appropriate one of said coupling means, said means being controlled by the magazine on said support as said support is moved from its first to its second position, and being reset for subsequent control by said support as said support is moved from its second to its first position.

11. A film record sound reproducer comprising a frame, a support for a film sound record magazine movable within said frame between a first position for receiving a film sound record magazine thereon and a second position for reproducing said film sound record, a magazine on said support containing a film sound record, spring means urging said support away from its second position, retaining means to hold said support in its second position, and means actuated by the film record for releasing said retaining means.

12. A film record sound reproducer comprising a frame, a support for a film sound record magazine movable within said frame between a first position for receiving a film sound record magazine thereon and a second position for reproducing said film sound record, a magazine on said support containing a film sound record, spring means urging said support away from its second position, retaining means to hold said support in its second position, a driving means for said reproducer, control means for said driving means, and means actuated by the film record for releasing said retaining means and so operating said control means as to stop said driving means.

13. A film record sound reproducer comprising a frame, a support for a film sound record magazine movable within said frame between a first position for receiving a film sound record magazine thereon and a second position for reproducing said film sound record, a magazine on said support containing a film sound record, spring means urging said support away from its second position, retaining means to hold said support in its second position, a driving means for said reproducer, an optical reproducer system on said frame, control means for said driving means and said optical reproducer system, and means actuated by the film record for releasing said retaining means and so operating said control means as to stop said driving means and deenergize said optical reproducer system.

14. A film record sound reproducer comprising, in combination, a frame, a support for a film sound record magazine, a film driving wheel, a magazine on said support containing a film sound record, a driving means for said driving wheel, said support being movable between a first position for receiving said magazine and a second position in which the film peripherally engages said driving wheel, spring means urging said support away from its second position, retaining means to hold said support in its second position, and means actuated by the film record for stopping the rotation of said driving wheel and releasing said retaining means, whereby said film is positively and promptly disengaged from said driving wheel.

15. A film record sound reproducer comprising, in combination, a frame, a support for a film sound record magazine on said frame, a film driving wheel, a film sound record magazine positionable on said support, said magazine comprising a supply spool, a take-up spool, and film wound on said spools, a driving means for said driving wheel, coupling means adapted to connect said driving means and said take-up spool, said support being movable between a first position for receiving said magazine and a second position in which the film peripherally engages said driving wheel and in which said coupling means engages said take-up spool to drive the same, spring means urging said support away from its second position, retaining means to hold said support in its second position, and means actuated by the film record for stopping the rotation of said driving means and releasing said retaining means, whereby said film is positively and promptly disengaged from said driving wheel and said take-up spool is positively and promptly disengaged from said coupling means.

16. In the film record sound reproducer of claim 15, additional manual means for releasing the retaining means and stopping the rotation of the driving means.

17. The combination film record and disc record sound reproducer of claim 4, in which the coupling means comprises a take-up shaft axially slidable in and connected in driving relation with said take-up spool and carrying a friction disc at its upper portion, said rotatable member having a portion thereof bearable against said friction disc, and pressure means on said support below said magazine active on said take-up shaft to force said friction disc into driven relation with that portion of said driving member bearable thereagainst.

18. In combination, a film record sound reproducer comprising a frame, a magazine on said frame, said magazine including a film record, a driving means for the film record on said frame, an optical reproducer system for the film record on said frame, an electrical circuit for the optical reproducer system, an electrical circuit for the driving means, manual means to energize the circuit for said driving means, means actuated by said magazine to energize the circuit for said reproducer system, and automatic cut-off means controlled by the film for deenergizing both said circuits.

19. In a film record sound reproducer, a frame, a film sound record magazine positionable on said frame, a film record in said magazine, a motor for driving the film record, an optical reproducer system for the film record, a first switch means for the motor, second and third switch means connected in series for the reproducer system, a manual control for operating the first and second switch means, a control engaged and actuated by said magazine for operating the third switch means, and automatic cut-off means controlled by the film record for opening said first and second switch means.

20. The film record sound reproducer of claim 3, in which the optical portion carried by the support is housed within a tube on said support and the film record magazine receives said tube within its recess, said tube serving to properly position said magazine on said support.

21. A film record sound reproducer, comprising a frame, an optical reproducer system thereon, a support for a film sound record magazine movable within said frame, a tube on said support housing a portion of the optical reproducer system, and a film record magazine having a recess and positionable on said support so as to receive said tube within said recess, said tube serving to properly position said magazine on said support.

22. A film record sound reproducer comprising a frame, a driving system on said frame, a magazine containing a film sound record movable on said frame into operative relation to said driving system, the film sound record being driven by said system, an optical reproducer system on said frame including an optical portion mounted on said frame so as to be movable into and out of said optical reproducer system, and an operative connection between said magazine and said optical portion so that motion of said magazine causes motion of said optical portion into said optical reproducer system when said magazine is moved into operative relation to said driving system.

23. A film record sound reproducer comprising a frame, a driving system on said frame, a magazine containing a film sound record movable on said frame into operative relation to said driving system, an optical reproducer system for the film record on said frame including an optical portion engageable with said magazine and mounted on said frame so as to be movable into and out of said optical reproducer system, control means for said driving system and said optical reproducer system, and a movable member operatively connected to said magazine and to said optical portion so that motion of the magazine causes corresponding motion of said movable member and said optical portion, said movable member being operatively connected to said control means so as to render said control means inoperative when said movable member is in a position such that said magazine is not in operative relation to said driving system, said movable member moving said optical portion into said optical reproducer system and rendering said control means operable when said movable member is moved into a position such that said magazine is in operative relation to said driving system.

24. In combination, a film record sound reproducer comprising a frame, a film record magazine thereon, said magazine including a film sound record, a driving means for the film record on said frame, an optical reproducer system for the film record on said frame, an electrical circuit for the driving means, an electrical circuit for the optical reproducer system, first switch means for the driving means circuit, second and third switch means connected in series for the reproducer system circuit, first and second controls operatively connected to said first and second switch means and a third control operatively connected to said third switch means, said first control being manually operable to close said first and second switch means, means operatively connected to said film record to actuate said second control to open said first and second switch means, and means connected to said magazine to actuate said third control to operate said third switch means.

FREEMAN H. OWENS.

REFERENCES CITED

The following references are of record in the file of this patent:

UNITED STATES PATENTS

| Number | Name | Date |
|---|---|---|
| 1,817,781 | Steiner | Aug. 4, 1931 |
| 1,839,037 | Kellogg | Dec. 29, 1931 |
| 1,572,648 | Gauriat | Feb. 9, 1932 |
| 1,952,809 | Kuchenmeister | Mar. 27, 1934 |
| 2,028,608 | Howell | Jan. 21, 1936 |
| 2,029,730 | Mallina | Feb. 4, 1936 |
| 2,084,947 | Czeija | June 22, 1937 |
| 2,096,445 | Begun | Oct. 19, 1937 |
| 2,135,026 | Becker | Nov. 1, 1938 |
| 2,322,400 | Sperry | June 22, 1943 |
| 2,372,637 | Williamson | Mar. 27, 1945 |
| 2,384,637 | Owens | Sept. 11, 1945 |
| 2,422,143 | Somers | June 10, 1947 |